L. D. JACOBY.
MACHINE FOR CUTTING AND FORMING SPOONS FROM SHEET MATERIAL.
APPLICATION FILED AUG. 30, 1916.

1,258,414.

Patented Mar. 5, 1918
2 SHEETS—SHEET 1.

INVENTOR:
Leo D. Jacoby
by Macleod, Calver, Copeland & Hake
Attys

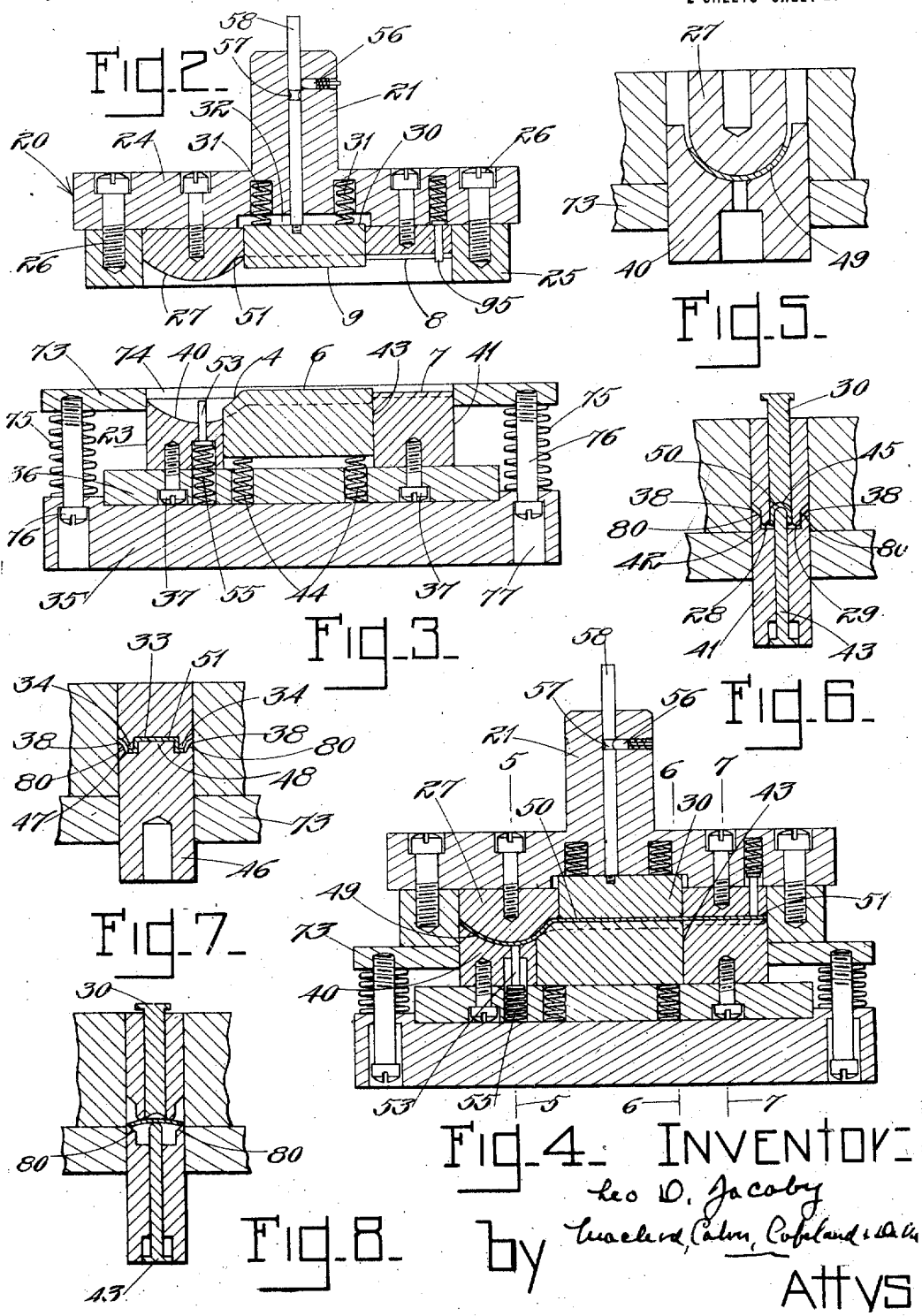

UNITED STATES PATENT OFFICE.

LEO D. JACOBY, OF BOSTON, MASSACHUSETTS, ASSIGNOR TO SANISPOON COMPANY, OF BOSTON, MASSACHUSETTS, A CORPORATION OF MASSACHUSETTS.

MACHINE FOR CUTTING AND FORMING SPOONS FROM SHEET MATERIAL.

1,258,414.   Specification of Letters Patent.   Patented Mar. 5, 1918.

Application filed August 30, 1916. Serial No. 117,764.

*To all whom it may concern:*

Be it known that I, LEO D. JACOBY, a citizen of the United States, residing at Boston, county of Suffolk, State of Massachusetts, have invented a certain new and useful Improvement in Machines for Cutting and Forming Spoons from Sheet Material, of which the following is a specification, reference being had therein to the accompanying drawings.

My invention has for its object a machine for cutting and forming paper spoons from a blank of sheet material. The machine embodying my invention is provided with a pair of coöperating male and female cutting dies which are in turn provided with forming dies so arranged and constructed that the blank is died out and thereafter molded to the proper shape in one cycle of operation. The device is particularly designed to produce spoons of a vulcanized or hard fiber but it is equally well adapted to produce spoons of any suitable paper composition. In order that the spoon may have the necessary strength and at the same time a proper and neat appearance, the sheet material of which the spoon consists is given a convex shape at the shank which is connected to the bowl by a rib or groove so that the bowl is held rigidly in position and is prevented from breaking or bending back in use. A spoon of the type described is fully shown in the drawings.

The device embodying my invention is so arranged and constructed that the spoon is first cut out to the proper shape and thereafter immediately formed to have a concave bowl and a convex shank and handle as described during one operation of a pair of cutting and forming dies. Heretofore I have found great difficulty in producing a machine which would cut out the spoon and give to the shank the required convex shape during a single operation of the dies without breaking or otherwise injuring the material. For this purpose, I provide dies which are so arranged and constructed that the cut blank is given the required convex shape at the handle and shank portion and while being molded is held along the line of bend so that the material is prevented from breaking or otherwise becoming injured.

My invention further consists in providing an intermittent feed mechanism by which the blank is fed to the cutting and forming dies and also in an automatic mechanism for removing the spoons from the dies as they are finished. It will be fully understood when taken in connection with the accompanying drawings and the novel features thereof will be pointed out and clearly defined in the claims at the close of this specification.

In the drawings Figure 1 is a front elevation of a machine embodying my invention.

Fig. 2 is a sectional detail of a female cutting and forming die.

Fig. 3 is a sectional detail of a male cutting and forming die and a stripper plate.

Fig. 4 is a sectional detail showing the male and female cutting dies in compressed position with a spoon between them.

Fig. 5 is an enlarged section on line 5—5 of Fig. 4.

Fig. 6 is an enlarged section on line 6—6 of Fig. 4.

Fig. 7 is an enlarged section on line 7—7 of Fig. 4.

Fig. 8 is a view similar to Fig. 6 showing the position of the die members and blank when the latter is being cut to shape.

Figure 1:
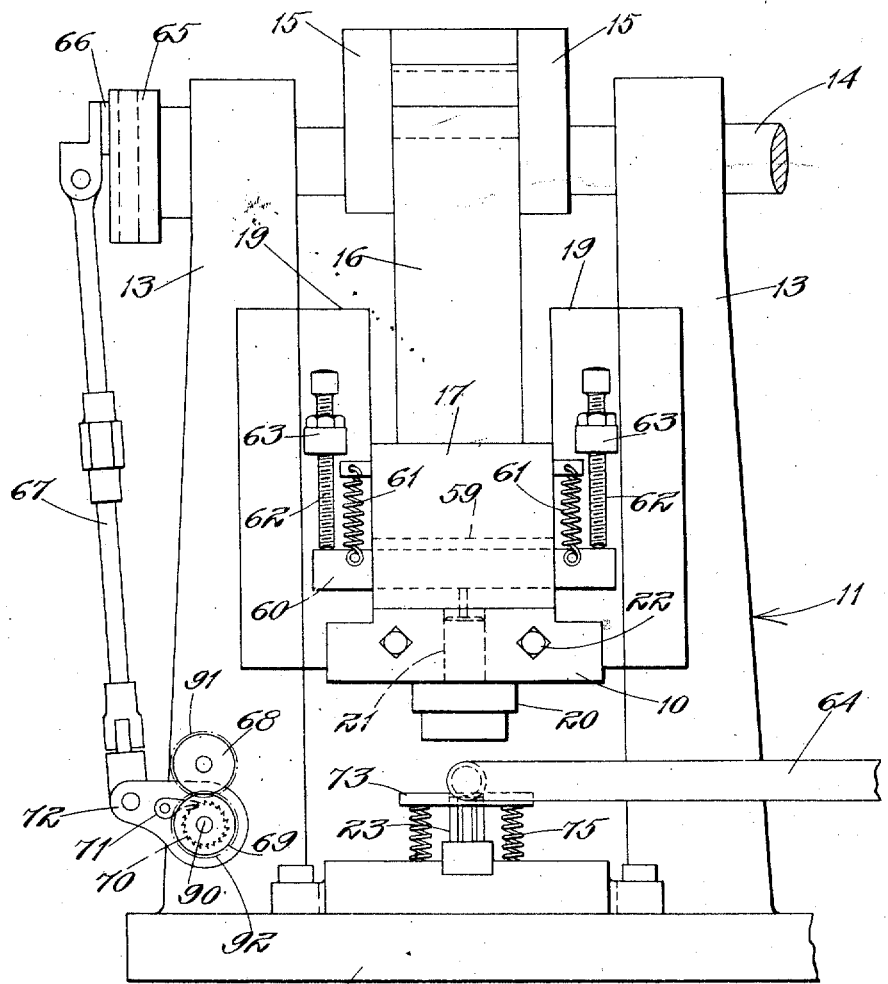

Having reference to the drawings there is shown at 11 a machine embodying my invention which comprises the usual base 12 and uprights 13 constituting the frame. The uprights 13 are provided with a drive shaft 14 which may be operated in any suitable manner such as by a pulley wheel or the like not shown. The shaft 14 is journaled in each upright and is provided centrally thereof with crank arms 15 to which is secured a connecting rod 16 pivotally mounted in a cross head 17 operating in ways 19 secured to the uprights 13. The cross head 17 consisting in part of a plate 10 carries at its lower end a die 20 having a shank 21 which is received through a hole in the cross head. The die 20 is reciprocated by the cross head 17 and is adapted to coöperate with a die 23 in a manner to be described.

Figure 9:
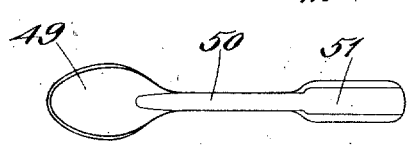
Fig. 9 is a plan of a finished spoon and Fig. 10 is a side elevation of the same.
Figure 10:
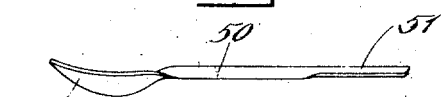

The die 20 comprises a holder 24 which is preferably integral with the shank 21 to which is secured a cutting die 25 by means of screw bolts 26. The cutting die 25 is a female die and is designed to cut a blank into the proper shape to form a spoon of the type shown in Figs. 9 and 10. Within the cutting die 25 is a forming die having a convex bowl-forming portion 27 and a concave shank forming portion 9 and handle forming portion 8. The shank forming portion 9 of the die has a pair of lips 28 and 29 shaped in cross section as shown in Fig. 6 and having a slot or hole between them in which is loosely received a block 30 of T-head cross section which is mounted on springs 31 received within a suitable recess of the holder 24. A portion of the holder 24 is recessed as shown at 32 to permit the block 30 to be moved inwardly against the pressure of the springs 31 in a manner to be described. The handle forming portion 8 of the die 20 is recessed at 33 and is provided with a pair of lips 34 in order to coöperate with the male die to give to the handle the proper shape.

The coöperating male die 23 is located on a base plate 35 having a recess in its upper surface in which is received a holder plate 36 which in turn carries the die 23 to which it is secured by means of screws 37. The die 23 is formed with cutting edges 38 adapted to coöperate with the cutting die 25 being arranged to enter within the die 25 when the members are brought together. Within the cutting edges 38 of the die 23 is a forming die consisting of a concave bowl-forming portion 40 adapted to coöperate with the convex bowl-forming portion 27 of the forming die hereinabove described to mold and form the bowl of the spoon. The shank forming portion 41 of the forming die is recessed at 42 to receive the lips 28 and 29 of the coöperating forming die. Centrally of the shank forming portion 41 is a slot which extends through the said shank and is enlarged at its lower end to loosely receive a rib 43 of T-head cross section. The rib 43 is yieldingly mounted on springs 44 and is arranged so that it projects slightly above the cutting edges 38 of the die when in compressed position as shown in Fig. 6 and still farther above the edges when in expanded position. The upper edge of the rib is rounded to correspond with the pressure groove 45 in the lower edge of the member 30. The left hand end of the rib is inclined as shown at 4 in Fig. 3 and projects slightly into the heel of the bowl portion 40 of the die. The handle portion 46 of the die is recessed at 47 and centrally of said recess is a forming member 48 of rectangular shape in cross section the upper surface of which is slightly above the cutting edge 38 of the die 23.

In Fig. 4 of the drawings is shown a spoon under compression between the dies 23 and 25. The concave bowl portion 49 of the spoon is formed between the convex and concave portions 27 and 40 of the forming dies. In order that the convex shank and handle portions 50 and 51 of the spoon may be first cut and then given the required convex shape it is necessary to withdraw the edges of the blank constituting the shank 50 and handle 51 of the spoon from the cutting edges of the die and force them down to the position shown in Figs. 6 and 7 without jamming or otherwise injuring the material. I accomplish this by providing the shank and handle portion 6 and 7 of the die 23 with relatively thin cutting edges 38 and by beveling the forming die at the edges of the recess 42 of the shank portion and recess 47 of the handle portion as shown at 80, and also by locating the rib 43 of the shank of the die 23 and forming member 48 in the handle portion of said die with their upper surfaces slightly above the cutting edges 38. As the cutting dies come together the blank is pressed against the rib 43 and the forming portion 48 so that when the blank is cut by the dies, it has a curve in cross section as shown in Fig. 8. When in this position the sides of the shank and handle portion of the blank incline downwardly as shown and are in a position to be drawn inwardly over the bevels 80 at the sides of the recess 42 of the shank portion and recess 47 of the handle portion, and are, therefore, ready to be molded inwardly by the forming dies without being jammed or otherwise injured. I have found that this construction enables a convex shank and handle portion to be formed immediately after the blank is cut to shape during one operation of the dies so that a perfect article without blemish or injury is produced.

Another feature of my invention relates to the arrangement and construction of the coöperating presser block 30 and rib 43. In order to produce a spoon of sufficient strength, I find that a shank of relatively great convexity is essential. Where the stock is molded at an acute angle as shown in Fig. 6, it has a tendency to disintegrate or break along the line of bend thereby weakening the article and giving it an unfinished appearance. In order to overcome this objection the block 30 is spring mounted as described and is so arranged that at the limit of its outward movement its grooved pressure surface 45 engages the stock just as the cutting edges of the dies sever the material of which the spoon is composed from the rest of the blank, the parts being in the position shown in Fig. 8. A further movement of the dies causes the shank forming portion 9 of the die 25 to press the edges of the blank inwardly and to force the block 30 upwardly against the springs 31. During the molding operation, therefore, the tension exerted by the springs 31 is brought to bear on the material at the line of bend and compresses the fiber together sufficiently to prevent them from disintegrating or becoming torn by the molding operation. I regard this as an import- Fig. 4 of the drawings. The stock is thus stretched slightly and curved over the rib and when in this position is severed by the dies. Simultaneously with the severing operation the spring block 30 engages with the stock and compresses it along the line of bend at the shank portion of the spoon. A further downward movement of the die 25 brings the shank-forming portion of the forming die in contact with the sides of the stock along the shank and handle portion of the spoon thus drawing the edges inwardly over the bevel at the sides of the recesses in the forming dies, and molds the stock as hereinabove described. At the same time the bowl portion of the spoon is formed by the convex and concave forming dies 27 and 40. The stripper plate 73 is pressed downwardly against the springs 75 so that the parts are in the position shown in Fig. 4. A further movement of the machine causes the die 25 to ascend so that the stripper plate 73 moves upwardly and strips the stock from the outside of the die 23, the spoon also being removed from the die by means of the pin 53. The spoon is then removed from the die 25 by the block 30 in the manner described above and then carried away by the draft from the blower. In the meantime the stock is fed to the dies and the device is ready for another operation.

While I have shown and described the machine embodying my invention as furnished with a single pair of coöperating dies it is obvious that a plurality of pair of dies may be employed so that any desired number of spoons may be cut and formed during one cycle of operation.

What I claim is:

1. In a machine of the character described, a pair of coöperating cutting dies, a pair of coöperating forming dies adapted to form from sheet material a spoon having a concave bowl portion, a handle portion and an intermediate shank portion, said shank portion being convex in cross section, and means which engage the sheet at the shank forming portion and clamp it against the portion of the die over which the concave side of the shank is bent, said dies and clamping mechanism being so adjusted that the shank portion of the spoon will be clamped against the portion of the die over which the concave side of the shank is to be bent before the portion of the coöperating die for the convex side of the shank begins to bend the shank portion of the spoon.

2. In a machine of the character described, a pair of coöperating male and female cutting dies, a pair of coöperating forming dies one of which is located in one of said cutting dies and the other of which is located in the other of said cutting dies, a spring mounted block having a groove therein located in one of said dies, a coöperating rib having a rounded pressure surface located in the other of said dies, and means for moving one of said dies against the other to cut a spoon from a blank and form it between them.

3. In a machine for forming spoons from sheet stock, a pair of coöperating cutting dies, one of which is provided with a forming die comprising a concave portion to form the bowl of a spoon, and a convex portion which extends above the cutting edges of the die and is adapted to form the shank and handle of a spoon, the other of said cutting dies being provided with a forming die comprising a convex portion adapted to coöperate with the said concave bowl forming portion, and a concave portion adapted to coöperate with the said shank forming and handle forming portion, and a spring mounted block having a groove in the surface thereof located in the shank forming portion of said second die and adapted to engage the shank of the spoon to prevent the same from breaking while being molded.

4. In a machine for forming spoons from sheet stock, a male cutting die having a concave portion to form the bowl of a spoon and a recessed portion with shank and handle forming members in said recess which project above the cutting edges of said die, a part of the sides of said recessed portion being beveled to permit the edges of a blank to be forced inwardly into said recess, and a coöperating female die carrying a coöperating forming die which is adapted to form the concave bowl of a spoon and to press the edges of a blank into said recess to form the convex shank and handle of a spoon.

5. In a machine for forming spoons from sheet stock, a cutting die having a recessed shank forming portion between the cutting edges thereof with beveled surfaces thereon, a rib having a rounded pressure surface projecting from said recessed portion above the cutting edges of said die, a coöperating cutting die having a forming die between the cutting edges thereof, said forming die being provided centrally thereof with a spring block which has a grooved surface adapted to coöperate with the rounded pressure surface of the said rib to hold the shank portion of a spoon blank after it is cut and while it is being pressed into the recess and formed by the forming die.

6. In a machine for forming spoons from sheet stock, a cutting and forming die having a recessed portion in the molding surface with a bevel at each side and a slot in the bottom thereof, a rib with a rounded pressure surface yieldingly mounted in said slot, said rib projecting from said recess and when compressed being in a position in which its rounded surface is slightly above the cutting edges of said die, a second cutting and forming die having a concave porant feature of my invention for I find that by constructing the device in the manner described, a perfectly formed spoon is obtained having a shank with the necessary convexity to afford the desired strength.

The portion 27 of the die 25 is provided with a groove 51 which coöperates with the inclined portion 4 at one end of the rib 43 and thereby forms a groove in the bowl of the spoon which strengthens it at the junction of the handle and bowl.

The device embodying my invention is further provided with means for automatically removing the spoon from the forming die of the die 23 as the die separates and for thereafter removing it from the forming die of the die 25 at the predetermined time so that the dies may be free for the next operation. For this purpose the die 23 has a hole through it which is enlarged and extends through the holder plate 36. Loosely mounted within the hole is a pin 53 which is mounted on a spring 55. When the dies come together to the position shown in Fig. 4, the pin 53 is pressed against the spring 55 and as the dies separate the spring moves the pin 53 upwardly and disengages the spoon from the die. The block 30 is prevented from moving outwardly under the influence of the springs 31 as the dies separate and thereby removing the finished article from the die 25 by means of a spring latch 56 located in the shank 21 of the die 25 and adapted to engage an annular groove 57 in a spindle 58 secured to the block 30 and loosely mounted in the shank as shown. When the block 30 is pressed inwardly in the die as is the case when the dies are in compressed position as shown in Fig. 4, the spring latch 56 engages with the groove 57 of the spindle 58 and holds the block 30 against the tension of the spring 31. A spring mounted pin 95 in the handle portion of the die tends to force the handle of the spoon out of the die but the tension of the spring is insufficient to disengage the entire spoon. As the dies separate therefor the finished spoon having been removed from the die 23 adheres to the die 25 and is lifted upwardly by the same. The free end of the spindle 58 projects above the shank 21 of the die into a slot 59 in the cross head 17 of the machine. Passing through the slot 59 in the cross head is a member 60 suspended on springs 61 and adapted to engage adjustable stops 62 passing through brackets 63 secured to the frame. As the cross head nears the upper end of its stroke the member 60 engages the stop 62 and contacts with the upper end of the spindle 58 of the block 30. The latch 56 is therefore forced out of the groove 57 and the block 30 is thrust to its outermost position thereby removing the spoon from the die. This construction enables the block 30 to be used not only as a means for engaging and holding the shank of the spoon during the molding operation to prevent its being broken at the line of bend, but also affords a means for removing the finished product from the die so that it will be ready for the next operation.

At 64 is shown a pipe which is connected with a suitable blower, not shown, by the draft from which the finished spoons are carried from between the dies and removed from the machine as fast as they are liberated.

In order to strip the uncut portion of the blank from the outside of the male cutting die 23, I provide a stripper plate 73 having a hole 74 through the center thereof shaped to conform to the male die 23 and adapted to make a snug working fit therewith. It is mounted on springs 75 interposed between the plate and the base and is provided with screw bolts 76 which are threaded at their upper ends into the plate. The shank of the screw bolt 76 makes a loose fit through holes in the base plate 35, the heads of the said bolts being received within recesses 77 and being adapted to engage with a portion of the base plate 35 when the stripper plate 73 is in its uppermost position. The uppermost position of the plate 73 may be thus regulated as desired the plate being preferably so arranged that its upper surface is slightly above the upper edge of the rib 43.

I also provide means in combination with the above for feeding the blank from which the spoons are died to the cutting and forming mechanism. On the end of the drive shaft 14 is a hub 65 on which is mounted a pin 66 to which is pivoted a connecting rod 67. A pair of feed rolls 68 and 69 geared together at 91 and 92 are journaled in the frame of the machine at a point opposite the upper surface of the die 23. The lower feed roll 69 has fixed on the end of its shaft 90 a ratchet wheel 70 which is engaged by a dog 71 mounted on an arm 72 loosely mounted on the shaft 90 of the feed roll. The lower end of the connecting rod 67 is pivotally connected to the arm 72 and gives to the same an oscillating motion which causes the feed wheels 68 and 69 to have a step by step feeding movement.

The operation of the machine is as follows: Properly tempered stock is fed to the cutting and forming dies by the feeding mechanism, the parts being so arranged that the stock is fed through the dies when they are separated and is at rest during the cutting and molding operation. As the cross head 17 descends the female die 25 contacts with the stripper plate 73 and pushes the blank downwardly against the rib 43 in the die 23 thus compressing the springs 44 on which the said rib is mounted until the rib reaches its lowermost position as shown in tion with a slot therein and adapted to fit about said rib and enter the recess at the sides thereof, and a yieldingly mounted block in said slot having a groove to coöperate with the rounded end of said rib and adapted to hold the stock at the shank of the spoon and prevent it from breaking while being molded to shape.

7. In a machine of the character described, a pair of coöperating male and female cutting dies, means for moving one of said dies toward and away from the other, a member for automatically removing a spoon from one of said dies when they separate, and means for thereafter automatically removing said spoon from the other of said dies.

8. In a machine of the character described, the combination of a pair of cutting and forming dies, one of which reciprocates toward and away from the other, of a member for automatically removing the spoon from one of said dies as they separate, a member for thereafter automatically removing the spoon from the other of said dies, and means for carrying the said spoon from between the dies before they come together again.

9. In a machine of the character described, the combination of a pair of forming dies one of which reciprocates, a rib on one of said dies, a coöperating block movably mounted in the other of said dies, a spring on which said block is mounted, a spindle secured to said block, a latch engaging said spindle to hold the spring in compressed position, and a stop for releasing said latch.

10. In a machine of the character described, the combination with a pair of coöperating dies for forming spoons from sheet stock of the improved spoon holding and removing mechanism which consists of a block movably mounted in one of said dies and having a spring which tends normally to press it outwardly therefrom, a spindle loosely mounted in said die which is secured to said block and has a groove therein, a spring latch adapted to engage said groove to hold said block inwardly in compressed position, means for reciprocating said die, and a stop to engage the said spindle as the said die reciprocates and thereby to release the said latch and permit the block to be pressed outwardly by the spring.

In testimony whereof I affix my signature.

LEO D. JACOBY.